United States Patent [19]

Celentino

[11] Patent Number: 4,568,103
[45] Date of Patent: Feb. 4, 1986

[54] VEHICLE ANCHORING SYSTEM

[75] Inventor: James L. Celentino, Macomb, Mich.

[73] Assignee: The United States of America as represented by the Secretary of the Army, Washington, D.C.

[21] Appl. No.: 635,072

[22] Filed: Jul. 27, 1984

[51] Int. Cl.$^4$ ............................................. B60S 9/10
[52] U.S. Cl. ................................. 280/765.1; 212/189
[58] Field of Search ............... 280/763.1, 764.1, 765.1, 280/766.1; 212/189; 24/602, 604, 606, 607, 651; 248/352; 403/322, 325, 328, 361; 244/161, 115, 116; 52/155; 410/76, 77, 80, 90, 91; 188/7

[56] References Cited

U.S. PATENT DOCUMENTS

| | | | |
|---|---|---|---|
| 3,834,731 | 9/1974 | Uehara | 280/150.5 |
| 4,116,467 | 8/1978 | Ewert | 212/189 |
| 4,245,855 | 1/1981 | Larson | 280/765.1 |
| 4,266,627 | 5/1981 | Lauber | 180/8 B |

OTHER PUBLICATIONS

Norco Catalog, Jan. 84, pp. 12 and 13.

*Primary Examiner*—David M. Mitchell
*Assistant Examiner*—Richard M. Camby
*Attorney, Agent, or Firm*—Peter A. Taucher; Gail S. Soderling; Robert P. Gibson

[57] ABSTRACT

A vehicle anchoring device is made with a hydraulic cylinder which is mounted on the vehicle and adapted to extend and retract a mounting arm. The mounting arm has an attachment head located on the outboard end of the mounting arm which is adapted to engage a complimentary anchor so as to hold the vehicle in a fixed position even when subjected to a large environmental stress.

15 Claims, 4 Drawing Figures

4,568,103

VEHICLE ANCHORING SYSTEM

GOVERNMENT INTEREST

The invention described herein may be manufactured, used, and licensed by or for the Government for governmental purposes without payment to me of any royalty thereon.

BACKGROUND OF THE INVENTION

In one aspect this invention relates to vehicle stability. In a further aspect this invention relates to methods and structures to prevent the tipping of a vehicle subjected to environmental loads.

Various structures have been proposed for stabilizing a vehicle. One broad class of stabilizing means are the outriggers commonly employed on construction machinery. When a vehicle is in position the outriggers are extended bring the outriggers into contact with the ground lifting the vehicle's wheels off the ground and providing a firm footing for the chassis of the vehicle. The resulting stabilized vehicle is better able to withstand loads when used as a platform for a back hoe or the like.

One example of a hydraulically activated outrigger is found in U.S. Pat. No. 4,266,627 which discloses outriggers mounted in combination with a wheel axle. The hydraulic cylinder is used to extend and contact the outrigger to lift or lower the vehicle chassis. Other examples of outrigger structures can be found in U.S. Pat. Nos. 3,834,731 and 4,245,855. All three of the structures cited have hydraulic means to extend the outriggers and lift the vehicle chassis. Such systems provide a good solid support mechanism for loading or construction. However, they all depend for their stability on the vehicle weight and placement of the outrigger pads. Such systems have no attachment to a permanent anchor and are not suited for maintaining the vehicle against the force of an explosive shock wave delivered to the sides of the vehicle.

Another example of stabilization is the use of chains which can be attached to the vehicle and a supporting structure such as a railroad car or trailer. Such a shipping tie down is useful in transporting a vehicle, but the chains are time consuming to attach and the individual who is attaching the chains must be outside the vehicle thereby being placed in an unsheltered position.

It would be desirable to have an attachment device as a stabilizing mechanism which would firmly anchor a vehicle to the earth or a similarly stable structure against shock waves such as those generated by large explosions. In addition the device should be operable from within the vehicle so the vehicle operator need not leave his position and be exposed to any hazzards present outside the vehicle.

BRIEF SUMMARY

The above desires are met by an anchoring device of the present invention. The device has an extensible mounting arm attached to the vehicle and bracketed so that the mounting arm can be moved from a first storage postion which allows the vehicle to move freely to a second anchoring position where the mounting arm can be used to secure the vehicle. The mounting arm has an attachment device mounted on its free outboard end. The attachment device is adapted and shaped so that it can be inserted into an anchor rigidly mounted in the area where the vehicle is to be secured. The mounting arm has control and positioning means to allow a person within the vehicle to position the arm into engagement with the anchor without having to leave the vehicle.

DETAILED DESCRIPTION

Figure 1:
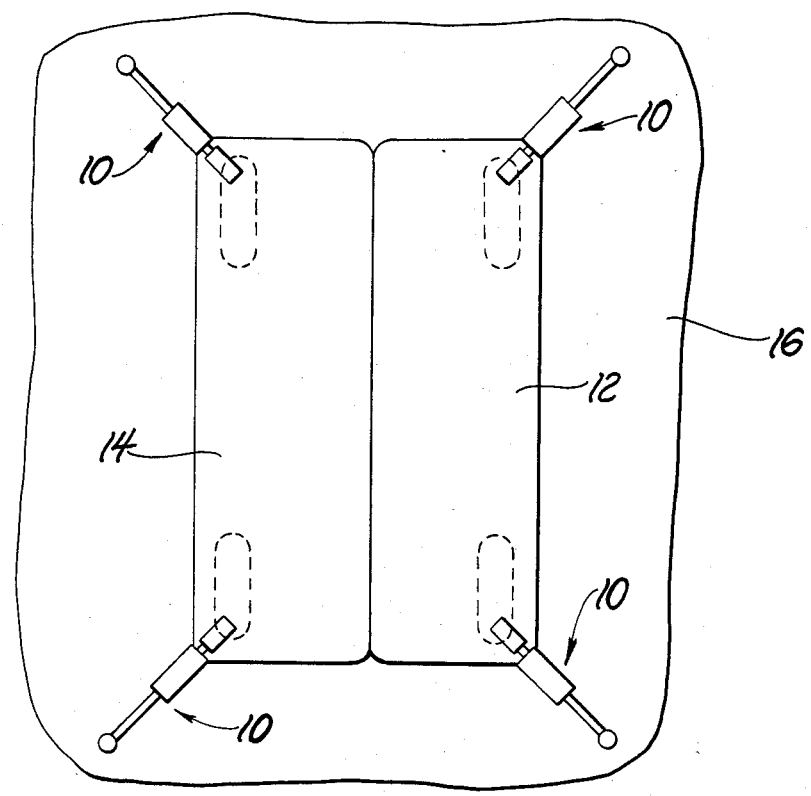
FIG. 1 is top schematic view of a pair of coupled vehicles stabilized by devices of this invention.

Referring to the accompanying drawing in which like numerals refer to like parts and initially to FIG. 1, vehicle anchoring devices 10 according to this invention are shown in the anchoring position. As shown, the anchoring devices 10 have been mounted on two vehicles 12, 14 which were first joined together to form a unit. The vehicle anchoring devices 10 are shown disposed on the corners of the unit formed by the joined vehicles and extend outward from the corners at approximately a 45° angle. The vehicle anchoring devices would be attached to an anchor located in a solid base, such as a concrete pad 16 or solid ground.

Figure 2:
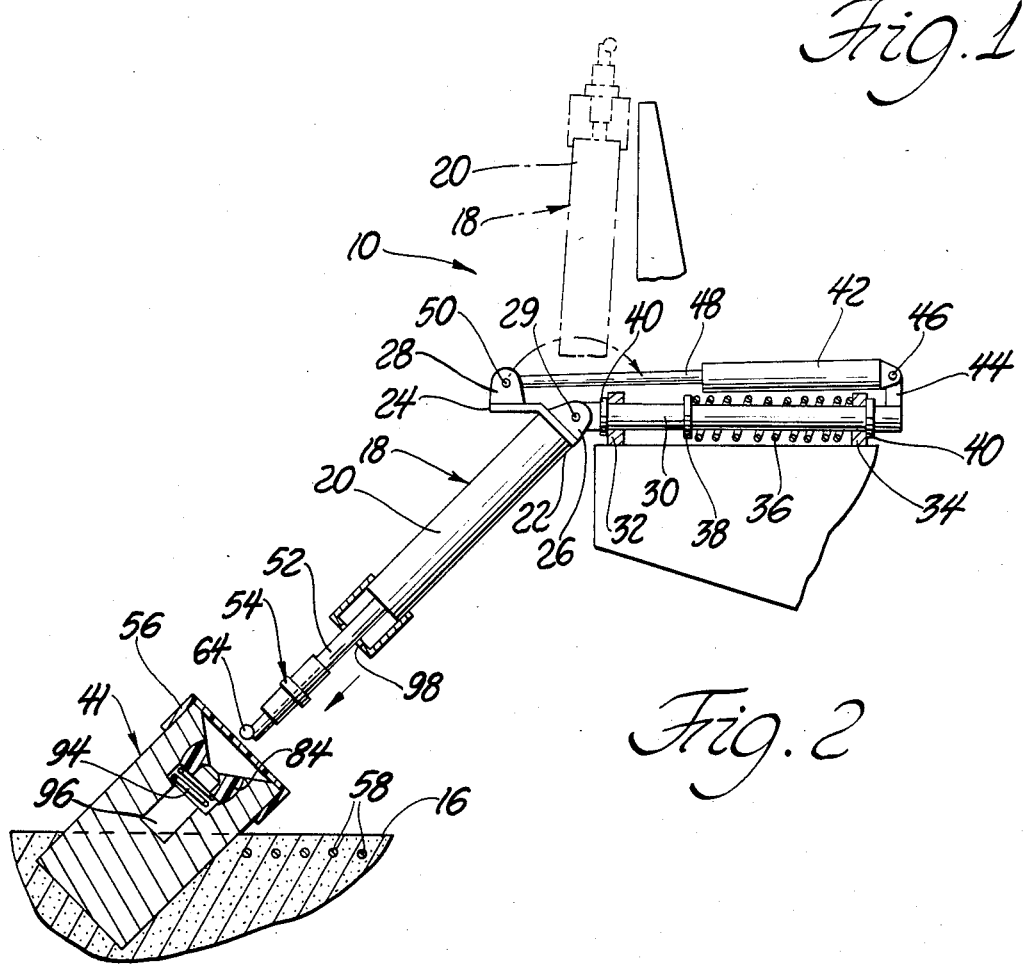
FIG. 2 is a front view of a stabilizing device according to this invention.

A more detailed representation of a vehicle anchoring device 10 according to this invention is found in FIG. 2; where the anchoring device 10 is attached to the vehicle 14. The anchoring device 10 has an extensible mounting arm 18 having a hydraulic cylinder 20 as a part of the arm. The mounting arm 18 has its inboard end 22, the end nearest the vehicle, attached to one leg of a rotatable angular bracket 24 and has a mounting boss 26 attached to the opposite side of the leg from the hydraulic cylinder. An activating boss 28 extends from the other, second, leg of the angular bracket on the same side of the bracket as the mounting boss.

The mounting boss 26 is journaled on a pin 29 to a rotating shaft 30 which is axially supported by and is free to rotate about its longitudinal axis within journal blocks 32, 34 rigidly attached to the vehicle 14 chassis. A coil spring 36 is coaxially mounted around the shaft 30 and has one end affixed to journal block 34 and the other end affixed to a flange 38 extending radially outward from the shaft 30 at a position between the journal blocks. Thus, the coil spring acts as a torsion spring allowing the mounting arm 18 to rotate to correctly align the mounting arm with the anchor 41 as will be discussed more fully hereinafter. However, absent a torsional force, the torsion spring 36 will rotate the arm 18 so that the arm is properly aligned with the vehicle to enter the storage position when the arm is retracted. The shaft 30 is restrained from longitudinal motion by a pair of retention flanges 40 which are rigidly attached to the shaft near its ends and abut the journal blocks 32, 34 to prevent axial motion of the shaft.

A positioning hydraulic cylinder 42 has one end of the cylinder mounted on a boss 44 extending radially outward from the inboard end of the shaft 30 and journaled on a pin 46 allowing the cylinder 42 rotational movement. The positioning cylinder has a positioning rod 48 extending from the end of the cylinder opposite the boss 44; the rod being attached to the cylinder for movement longitudinally along the axis of the positioning cylinder 42. The positioning rod 48 is rotatably journaled to the activating boss 28 with a pin 50. Activating the positioning cylinder 42 to cause extension of positioning rod 48 from the cylinder will rotate angle bracket 24 counterclockwise about the pin 29 as shown in FIG. 2 to the anchoring position. When positioning cylinder 42 is activated to draw positioning rod 48 into the cylinder, the bracket 24 is rotated clockwise to rotate the mounting arm 18 into the storage position shown in phantom in FIG. 2. The structure and control means for activating the hydraulics of the cylinder are not shown as these elements are within the skill of the hydraulics design art.

The extensible mounting arm 18 has hydraulic cylinder 20 which moves rod 52 into or out of the cylinder to position an attachment means 54 so as to engage or to disengage the anchor 41.

The anchor 41 is shown set in a concrete pad 16 and has a cover 56 which can be a throw away or a puncturable structure such as plastic. The cover 56 will prevent the accumulation of any water, snow or debris in the anchor which might interfere with the anchor's smooth operation. Where it is desired to keep the surrounding area free of ice and snow heating coils 58 could be disposed in the concrete pad 16 surrounding the anchor 41 and activated when required by the weather conditions.

Figure 3:
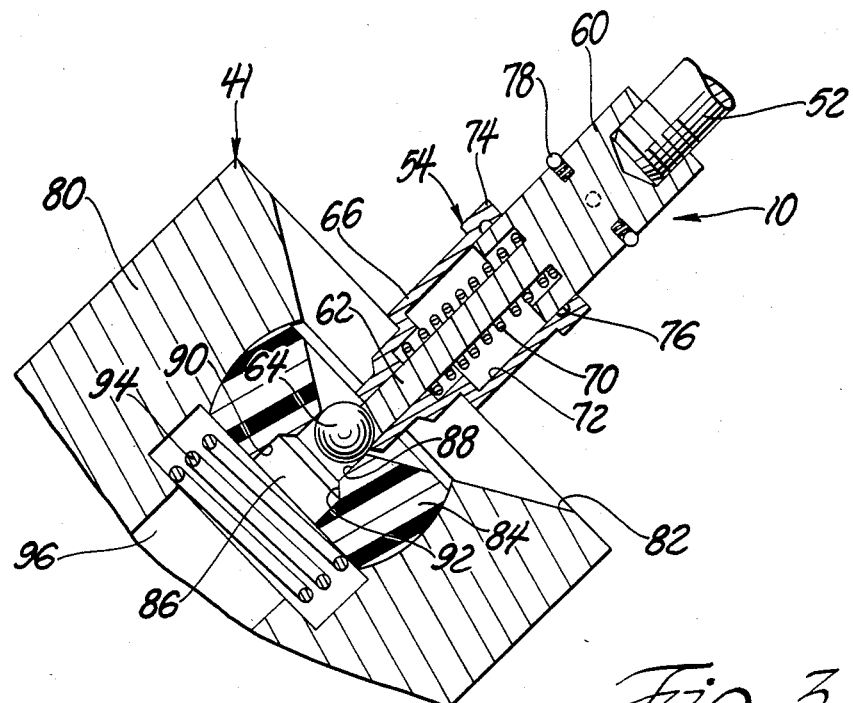
FIG. 3 is an enlarged view of the device of FIG. 2, showing the attachment member contacting an anchor.
Figure 4:
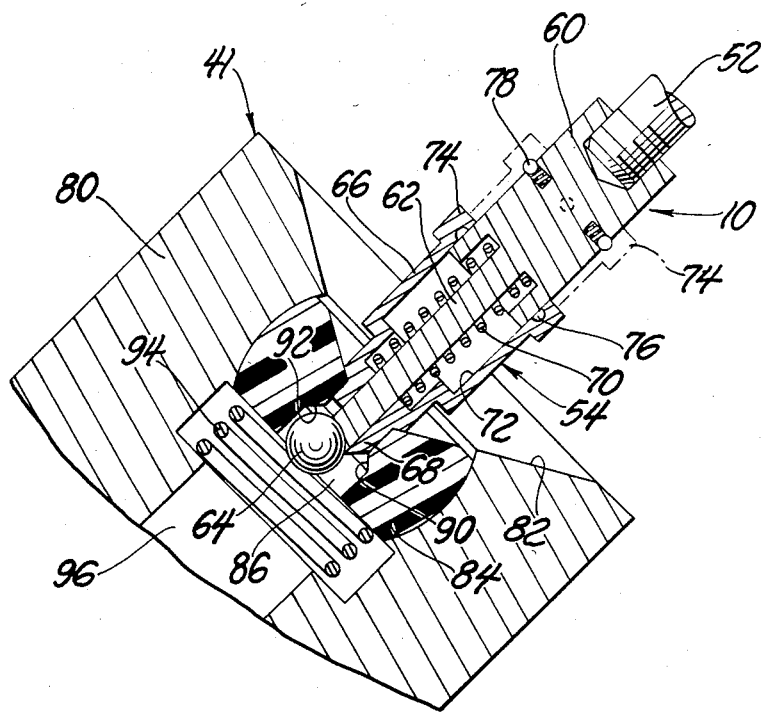
FIG. 4 is a view of the device of FIG. 2, with the attachment member seated in the anchor.

FIGS. 3 and 4 show the operation of the attachment mechanism 54 and its cooperation with the anchor 41 in greater detail. Specifically attachment mechanism 54 includes a supporting extension 60 firmly fastened to attachment rod 52 such as by threads and having a finger 62 extending axially out from the extension. A ball 64 is rigidly mounted on the finger 62 so that the center of the ball is offset from the longitudinal axis of the extension 60. A shaped collar 66 is coaxially mounted about the extension 60 and finger 62 for reciprocating motion along the extension between a first extended and a second retracted position. That portion of the collar 66 which moves over the extension 60 has a sliding fit with the outer surface of the extension and the collar has a reduced section which supports a reduced diameter on the terminal end 68 to provide a sliding fit between the collar and finger 62. A coil spring 70 is located within the chamber formed by the finger 68 and the collar 66. The spring 70 biases the collar towards the ball into the first extended position. In the first extended position, terminal end 68 of the collar 66 is in contact with the ball 64.

The collar 68 also has a radially extending flange 74 with a annular groove 76 formed on the collar's inner surface. When the collar is moved to its retracted position, the annular groove 76 is adapted to engage a plurality of spring loaded ball detents 78 which would hold the collar 66 in the retracted position.

The anchor 41 includes a housing 80 formed of metal or the like firmly mounted in the concrete pad 16. As shown, the axis of the housing is essentially 45° to the surface plane of the pad 16. The housing 80 has a frusto-conical entry port 82 adapted to engage and guide the attachment means 54 into axially alignment with the anchor 41. A flexible torroidal insert 84 is disposed in a complimentary cavity formed in the housing 80. The torroidal insert 84 has a conical entry shaped to conform to the entry port's 82 shape to allow easy axial alignment of the ball 64 within the torroidal insert. The torroidal insert has a shaped ball engaging chamber 86 comprising a relatively narrow neck 88 on the entry side of the insert and a larger hollow 90 on the side of the torroidal insert opposite the entry port. The resulting structure has a shoulder 92 which can be used to hold the ball 64 in position. The torroidal insert 84 is mounted on spring 94 disposed with a T-shaped chamber 96. The spring 94 will bias the torroidal insert 84 into a position with the torroid's axis nominally aligned coaxially with the housing but if the attachment means 54 is not axially aligned with the torroidal insert, then the torroidal insert can rotate to a position where the ball more easily enters and passes through the neck 88.

OPERATION

When a vehicle is to be anchored using the device of this invention, the vehicle with the anchoring device 10 is driven to a location having complimentary anchors 41 disposed in a configuration to accept the anchoring devices present on the vehicle 14. The anchoring devices would be in the storage mode as shown in phantom in FIG. 2. The positioning cylinder 42 is activated to extend positioning rod 48 and rotate the bracket 24 counterclockwise which in turn rotates the extensible mounting arm 18 to a lowered position nearly aligned to the axis of the anchor 41.

The hydraulic cylinder 20 is then activated to extend attachment rod 52 towards the torroidal insert 84. As the ball 64 moves into the cover 56 it will rupture the cover and continue in the general direction of the neck 88. If the ball is not fully centered, the frusto-conical entry port will direct the ball 64 towards the neck 88 by causing the bracket to rotate against the hydraulic force of cylinder 42 so that the ball has substantial freedom of movement to allow engagement with the torroidal insert neck 88. As the ball 64 enters the neck 88 as shown in FIG. 3 it slips easily inward since the neck is substantially the same size as the ball's diameter. As the attachment rod 52 continues through the neck 88, the terminal end 68 of the collar 66 engages the neck in a manner so that the diameter of the ball when combined with the collar thickness is too wide for the ball 64 to be withdrawn. The ball rests against the shoulder 92 and is prevented from withdrawal. Generally there would be a sensor (not shown) located within the T-shaped chamber 96 to signal cylinder 20 that the attachment mechanism is fully engaged and the unit stopped.

To effect withdrawal, the attachment rod 52 is forced further into T-shaped chamber 96 so that the torroidal insert 84 will force the collar 66 axially along supporting extension 60 to a retracted position until the plurality of ball detents 78 engage the annular groove 76 in the collar. The detents will hold the collar in the retracted position against the biasing force of the spring 70 as the attachment rod is withdrawn. Since ball 64 is held at a distance from the collar, the ball can be easily withdrawn from the torroidal insert 84 freeing the attachment device from the anchor.

As the attachment bar is further retracted an auxiliary cylindrical bracket 98 (FIG. 2) which is attached to and extends coaxially around about the attachment rod 52 will contact the flange 74 or collar 66 forcing the collar off the ball detents 78 and allowing the spring 70 to return the collar to its normal position.

The positioning cylinder 42 can then be activated to draw the positioning rod in and return the anchoring device to its stowed position.

The above described device can be activated so as to anchor a vehicle in a matter of minutes without the operator having to leave the security of the vehicle.

I wish it to be understood that I do not desire to be limited to the exact details of construction shown and described for obvious modifications will occur to a person skilled in the art, without departing from the spirit and scope of the appended claims.

I claim:

1. A device for securely anchoring a vehicle so as to maintain its position when subjected to wind or shock waves, said device including: a bracket rotatably mounted on the vehicle to be secured, an extensible mounting arm having one end attached to the bracket which can be rotated between a storage position and an anchoring position, the mounting arm comprising an anchoring hydraulic cylinder, a rod extending longitudinally outward from the hydraulic cylinder, and adapted to be extended and retracted by the cylinder, the end of the rod distal the hydraulic cylinder having an attachment means the attachment means having an extended position and a retracted position; a positioning means attached to the bracket offset from the axis of the mounting of the anchoring cylinder so said positioning means can rotate the anchoring cylinder between a storage position and an anchoring position, a control means associated with the positioning means to operate the positioning means; an anchor member rigidly and permanently affixed to the ground for holding a vehicle in position said anchor member being adapted to receive and hold the attachment means when the attachment means is inserted into the anchor member and further adapted to apply a force to the attachment means moving it to a retracted position as the attachment means is forced into the anchor member to effect disengagement of the attachment means; sensing means located within the anchor member to signal the hydraulic cylinder the attachment means is fully inserted and stop the rod extension.

2. The device of claim 1 wherein said attachment means comprises a ball fastened in the rod, a reciprocating collar coaxially mounted on the rod, biasing means adapted to bias the collar into engagement with the ball, retention means adapted to engage the collar and hold said collar in a retracted position when said ball is forced into the anchor member.

3. The device of claim 2 wherein said retraction means comprises an annular groove formed on the inner surface of the collar and a plurality of biased spherical members adapted to grip the annular groove when the collar is retracted.

4. The device of claim 1 wherein said anchor means comprises an anchor housing rigidly mounted to the ground, a torroidal insert mounted within the housing said insert having a shaped aperture adapted to receive the attachment means.

5. The device of claim 4 wherein said torroidal insert is spring mounted within the anchor housing to allow the torroidal member to rotate into alignment with the axis of the mounting arm.

6. The device of claim 4 where the anchor housing has a frustoconical surface formed on the outer surface of the anchor housing to direct the attachment means into the torroidal insert.

7. The device of claim 1 where said bracket is rotatably mounted on a shaft mounted on the vehicles said shaft being journaled on a pair of spaced blocks, said shaft having associated torsional means which allows the mounting arm to rotate into alignment with the anchor housing during attachment and rotate the mounting arm into the proper position for storage in a retracted position.

8. The device of claim 7 wherein said biasing means is a coil spring coaxially mounted about the shaft and having one end attached to one of the journal blocks and the other end attached to a radially extending flange mounted between the journal blocks.

9. A device for securely anchoring a vehicle so as to maintain its position when subjected to wind or shock waves, said device including: a bracket rotatably mounted on the vehicle to be secured; an extensible mounting arm having one end attached to the bracket to allow rotation between a storage position and an anchoring position, the mounting arm comprising an anchoring hydraulic cylinder with a piston disposed therein, said piston being connected to a rod which extends longitudinally outward from the hydraulic cylinder, said hydraulic cylinder being adapted to extend and retract the rod, the end of the rod distal the hydraulic cylinder having a ball attachment means with a ball fastened to the rod, a reciprocating collar mounted coaxially on the rod, the collar being biased to a position near the ball, the collar having associated retraction means associated therewith to engage and hold the collar in a retracted position against the biasing means; a positioning hydraulic cylinder having one end attached to the vehicle and a positioning rod extending from the other end, the positioning hydraulic cylinder having one end attached to the vehicle and a positioning rod extending from the other end, the positioning rod being attached to the bracket offset from the axis of the mounting of the anchoring cylinder so said positioning cylinder can rotate the anchoring cylinder between the storage position and the anchoring position; a control means associated with the positioning cylinder; to operate the positioning cylinder to move the positioning rod; an anchor member rigidly and permanently affixed for holding a vehicle in position said anchor member comprising a housing which is rigidly mounted to the ground, a flexible, shaped torroidal insert mounted within the housing, said torroidal insert having a shaped aperture adapted to receive the ball and when the collar is brought into engagement with the torroidal insert the ball is locked in the anchor member the insert being adapted to force the collar into its retracted position when the attachment means is fully inserted to allow withdrawal of the ball.

10. The device of claim 9 wherein said retraction means comprises an annular groove formed on the inner surface of the collar and a plurality of biased spherical member adapted to grip the annular groove when the collar is retracted.

11. The device of claim 9 wherein said torroidal insert is spring mounted within the anchor housing to allow the torroidal member to rotate into alignment with the axis of the mounting arm.

12. The device of claim 9 where the anchor housing has a frustoconical surface formed on the outer surface of the anchor housing to direct the attachment means into the torroidal insert.

13. The device of claim 9 where said bracket is rotatably mounted on a shaft mounted on the vehicle said shaft being journaled on a pair of spaced blocks, said shaft having associated torsional means which allows the mounting arm to rotate into alignment with the anchor housing during attachment and rotate the mounting arm into the proper position for storage in a retracted position.

14. The device of claim 13 wherein said biasing means is a coil spring coaxially mounted about the shaft and having one end attached to one of the journal blocks and the other end attached to a radially extending flange mounted between the journal blocks.

15. A device for securly anchoring a vehicle so as to maintain its position when subjected to wind or shock waves, said device including: a bracket attached to the outboard end of the mounting shaft; a mounting shaft mounted on the vehicle, said shaft being journaled on a pair of spaced blocks, said shaft having associated torsion means which allows rotation of devices attached to the mounting shaft; an extensible mounting arm having one end attached to the bracket to allow rotation between a storage position and an anchoring position, the mounting arm comprising an anchoring hydraulic cylinder with a piston disposed therein, said piston being connected to a rod which extends longitudinally outward from the hydraulic cylinder, the end of the rod distal the hydraulic cylinder having a ball attachment means with a ball fastened to the rod, a reciprocating collar mounted coaxially on the rod, the collar being spring biased to a position near the ball, the collar having a groove formed on the inner surface, a detent located on said rod at a position between said cylinder and the normal position of the collar, the detent being adapted to engage and hold the collar in a retracted position against the spring biasing means force; a positioning hydraulic cylinder having one end attached to the vehicle and a positioning rod extending from the other end, the positioning hydraulic cylinder having one end attached to the vehicle and a positioning rod extending from the other end, the positioning rod being attached to the bracket offset from the axis of the mounting of the anchoring cylinder so said positioning cylinder can rotate the anchoring cylinder between the storage position and the anchoring position, a control means associated with the positioning cylinder to operate the positioning cylinder; an anchor member rigidly and permanently affixed for holding a vehicle in position said anchor member comprising a housing which is rigidly mounted in the ground, said housing having a frusto-conical surface adapted to receive and direct the attachment means towards axis of the housing, a flexible, shaped torroidal insert mounted within the housing, said torroidal insert having a shaped aperture adapted to receive the ball and when the collar is brought to engagement with the torroidal insert the ball is locked in the anchor member, the torroidal insert being spring mounted so that the torroidal insert can rotate within the housing so that the insert can respond to minor misalignment of the ball into the aperture prior to locking.

* * * * *